US008916637B2

(12) United States Patent
Van Hartingsveldt et al.

(10) Patent No.: US 8,916,637 B2
(45) Date of Patent: Dec. 23, 2014

(54) AROMATIC POLYCARBONATE COMPOSITION

(71) Applicant: Mitsubishi Chemical Europe GmbH, Dusseldorf (DE)

(72) Inventors: Edwin Adriaan Andre Van Hartingsveldt, Maastricht (NL); Martinus Louis Maria Bos, Born (NL)

(73) Assignee: Mitsubishi Chemical Europe GmbH, Dusseldorf (DE)

( * ) Notice: Subject to any disclaimer, the term of this patent is extended or adjusted under 35 U.S.C. 154(b) by 146 days.

(21) Appl. No.: 13/750,891

(22) Filed: Jan. 25, 2013

(65) Prior Publication Data

US 2013/0143994 A1 Jun. 6, 2013

Related U.S. Application Data

(62) Division of application No. 12/673,841, filed as application No. PCT/EP2008/060523 on Aug. 11, 2008.

(30) Foreign Application Priority Data

Aug. 17, 2007 (EP) .................................... 07016187

(51) Int. Cl.

| | |
|---|---|
| ***C08G 63/02*** | (2006.01) |
| ***C08L 51/04*** | (2006.01) |
| ***C08L 69/00*** | (2006.01) |
| ***C08L 51/00*** | (2006.01) |
| *C08G 64/00* | (2006.01) |
| *C08L 55/02* | (2006.01) |
| *C08K 3/22* | (2006.01) |

(52) U.S. Cl.

CPC ................. *C08L 69/00* (2013.01); *C08L 51/04* (2013.01); *C08L 55/02* (2013.01); *C08K 3/22* (2013.01); *C08L 51/00* (2013.01)

USPC ......................... 524/430; 204/157.4; 524/407

(58) Field of Classification Search

USPC .................................. 204/157.4; 524/407.43

See application file for complete search history.

(56) References Cited

U.S. PATENT DOCUMENTS

| | | | |
|---|---|---|---|
| 3,761,440 | A | 9/1973 | Margotte et al. |
| 4,931,503 | A | 6/1990 | Boutni et al. |
| 5,405,892 | A | 4/1995 | Krishnan et al. |
| 6,207,344 | B1 | 3/2001 | Ramlow et al. |
| 7,060,421 | B2 | 6/2006 | Naundorf et al. |
| 7,083,848 | B2 | 8/2006 | Kliesch, II et al. |
| 2003/0166761 | A1 | 9/2003 | Weber et al. |
| 2004/0241422 | A1 | 12/2004 | Naundorf et al. |
| 2005/0069688 | A1 | 3/2005 | Kliesch et al. |
| 2005/0159546 | A1 | 7/2005 | Weber et al. |
| 2005/0164022 | A1 | 7/2005 | Kliesch et al. |
| 2006/0286365 | A1 | 12/2006 | Lee et al. |
| 2007/0135544 | A1 | 6/2007 | Seidel et al. |
| 2008/0171181 | A1 | 7/2008 | Zaderej |
| 2009/0064904 | A1 | 3/2009 | Friedrich et al. |
| 2009/0292048 | A1 | 11/2009 | Li et al. |

FOREIGN PATENT DOCUMENTS

| | | |
|---|---|---|
| DE | 102006017 | 9/1992 |
| EP | 503551 | 9/1992 |
| JP | 2002-60610 | 2/2002 |
| JP | 2003-510416 | 3/2003 |
| JP | 2003-342462 | 12/2003 |
| JP | 2004-2750 | 1/2004 |
| JP | 2004-534408 | 11/2004 |
| JP | 2005-213501 | 8/2005 |
| JP | 2006-348298 | 12/2006 |
| WO | WO 01/23189 | 4/2001 |

OTHER PUBLICATIONS

International Search Report for PCT/EP2008/060523, mailed Mar. 12, 2009.

Written Opinion of the International Searching Authority for PCT/EP2008/060523, mailed Mar. 12, 2009.

JP Notice of Reasons for Rejection with English-Language Translation dated Jan. 22, 2013.

Notice of Opposition to a European Patent, EP Patent No. 2178976, Francesco Felisati, Internazionale Brevetti Ingg. Zini, Maranesi & C. S.r.l., Nov. 20, 2013, pp. 1-4.

Internazionale Brevetti Ingg. Zini, Maranesi & C. S.r.l., Opponent's Letter to EPO dated Nov. 20, 2013, pp. 1-16.

Albrecht Müller, "Einfärben von Kunststoffen," Carl Hanser Verlag 2002, ISBN 3-446-21990-0; Chapter 5.

MSDS of Copper Chromite Black Spinel Black 1, The Shepherd Color Company, Rev. Jun. 22, 2012.

Rohm and Haas; "Paraloid™ EXL-2600/3600 in Polycarbonate," Revision No. 0 of Jan. 2001, available at www.dow.com/assets/attachments/business/pbm/paraloid_exl/paraloid_exl-3600/tds/paraloid_exl-2600_3600.pdf.

Hüske et al, "Laser Supported Activation and Additive Metallization of Thermoplastics for 3D-MIDS," Proceedings of the 3rd LANE 2001, Aug. 28-31, 2001, Erlangen, Germany.

"Elastomere, Elaste," Chapter 5 of Maschinenbau-Wissen.de, Section "Kunststofftechnik," available at www.maschinenbau-wissen.de/skript/werkstofftechnik/kunststoffe/90-elsatomere.

*Primary Examiner* — Terressa Boykin

(74) *Attorney, Agent, or Firm* — Nixon & Vanderhye P.C.

(57) ABSTRACT

A process for producing a circuit carrier comprising at least a molded part and a circuit carried by the molded part, wherein the molded part includes a polycarbonate composition having the following components:

a) 30-97 mass % of aromatic polycarbonate, b) 0.5-20 mass % of a metal compound capable of being activated by electromagnetic radiation and thereby forming elemental metal nuclei, and c) 2.5-50 mass % of at least one rubber-like polymer, wherein the sum of a)-c) is 100%.

10 Claims, No Drawings

AROMATIC POLYCARBONATE COMPOSITION

This application is a divisional of commonly owned co-ending U.S. application Ser. No. 12/673,841, filed May 6, 2010, which is the national phase application under 35 USC §371 of PCT/EP2008/060523, filed Aug. 11, 2008, which designated the U.S. and claims benefit of EP 07016187.2, filed Aug. 17, 2007, the entire contents of each of which are hereby incorporated by reference.

The invention relates to a polymer composition comprising a polymer, in particular an aromatic polycarbonate, and a metal compound capable of being activated by electromagnetic radiation and thereby forming elemental metal nuclei. The invention also relates to a process for producing such a composition, to a moulded part containing this composition, to a circuit carrier containing such moulded part and to a process for producing such circuit carrier.

Polymer compositions comprising a polymer and a metal compound capable of being activated by electromagnetic radiation and thereby forming elemental metal nuclei are for example described in U.S. Pat. No. 7,083,848 and U.S. Pat. No. 7,060,421. Such polymer compositions can advantageously be used for producing a non-conductive part on which conductive tracks are to be formed by irradiating areas of said part with electromagnetic radiation to break down the metal compound(s) and release metal nuclei, and subsequently metallizing the irradiated areas to accumulate metal on these areas.

Applicant has found now that the presence of such metal compounds in aromatic polycarbonate compositions results in degradation of the polycarbonate resulting in a decrease of the melt stability of the compositions and thus in less stable processing.

The object of the invention is to provide a polycarbonate composition, comprising a metal compound capable of being activated by electromagnetic radiation and thereby forming elemental metal nuclei, that does not show said drawback or shows it to a lesser extent.

This object is achieved in that the polymer composition contains the following components:

a) 30-97 mass % of aromatic polycarbonate, b) 0.5-20 mass % of a metal compound capable of being activated by electromagnetic radiation and thereby forming elemental metal nuclei, and c) 2.5-50 mass % of at least one rubber like polymer, wherein the sum of a)-c) is 100%.

It has surprisingly been found that the degradation of the aromatic polycarbonate in the polymer composition according to the present invention is decreased or even prevented, as for example manifested in an increase of melt flow stability and/or toughness. As used herein, degradation of polycarbonate refers to a reduction in molecular weight.

The present invention therefore also relates to a process for reducing degradation of the aromatic polycarbonate in an aromatic polycarbonate composition also containing a metal compound b) capable of being activated by electromagnetic radiation and thereby forming elemental metal nuclei, by mixing said composition with at least one rubber like polymer to obtain a polymer composition containing the following components a) 30-97 mass % of aromatic polycarbonate, b) 0.5-20 mass % of a metal compound capable of being activated by electromagnetic radiation and thereby forming elemental metal nuclei, and c) 2.5-50 mass % of at least one rubber like polymer, wherein the sum of a)-c) is 100%. In a preferred embodiment, the polymer composition contains a) 30-95 mass % of aromatic polycarbonate, b) 0.5-20 mass % of a metal compound capable of being activated by electromagnetic radiation and thereby forming elemental metal nuclei, and c) 4.5-50 mass % of at least one rubber like polymer, wherein the sum of a)-c) is 100%.

The polycarbonate composition according to the invention contains inter alia from 30 up to 97 mass % of aromatic polycarbonate, preferably from 30 up to 96 mass %, preferably from 30 up to 95 mass %, more preferably from 15 up to 90 mass % of aromatic polycarbonate, even more preferably from 50 up to 85 mass % of aromatic polycarbonate. Suitable aromatic polycarbonates are polycarbonates made from at least a divalent phenol and a carbonate precursor, for example by means of the commonly known interfacial polymerization process or the melt polymersiation method. Suitable divalent phenols that may be applied are compounds having one or more aromatic rings that contain two hydroxy groups, each of which is directly linked to a carbon atom forming part of an aromatic ring. Examples of such compounds are 4,4'-dihydroxybiphenyl, 2,2-bis(4-hydroxyphenyl)propane (bisphenol A), 2,2-bis(4-hydroxy-3-m ethylphenyl)propane, 2,2-bis-(3-chloro-4-hydroxyphenyl)-propane, 2,2-bis-(3,5-dimethyl-4-hydroxyphenyl)-propane, 2,4-bis-(4-hydroxyphenyl)-2-methylbutane, 2,4-bis-(3,5-dimethyl-4-hydroxyphenyl)-2-methylbutane, 4,4-bis(4-hydroxyphenyl) heptane, bis-(3,5-dimethyl-4-hydroxyphenyl)-m ethane, 1,1-bis-(4-hydroxyphenyl)-cyclohexane, 1,1-bis-(3,5-dimethyl-4-hydroxyphenyl)-cyclohexane, 2,2-(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxyphenyl)methane, bis-(3,5-dimethyl-4-hydroxyphenyl)-sulphon, bis-4-hydroxyphenylsulphon, bis-4-hydroxyphenylsulphide.

The carbonate precursor may be a carbonyl halogenide, a halogen formate or carbonate ester. Examples of carbonyl halogenides are carbonyl chloride and carbonyl bromide. Examples of suitable halogen formates are bis-halogen formates of divalent phenols such as hydroquinone or of glycols such as ethylene glycol. Examples of suitable carbonate esters are diphenyl carbonate, di(chlorophenyl)carbonate, di(bromophenyl)carbonate, di(alkylphenyl)carbonate, phenyltolylcarbonate and the like and mixtures thereof. Although other carbonate precursors may also be used, it is preferred to use the carbonyl halogenides and in particular carbonyl chloride, also known as phosgene.

The aromatic polycarbonates in the composition according to the invention may be prepared using a catalyst, an acid acceptor and a compound for controlling the molecular mass.

Examples of catalysts are tertiary amines such as triethylamine, tripropylamine and N,N-dimethylaniline, quaternary ammonium compounds such as tetraethylammoniumbromide and quaternary phosphonium compounds such as methyltriphenylfosfoniumbromide.

Examples of organic acid acceptors are pyridine, triethylamine, dimethylaniline and so forth. Examples of inorganic acid acceptors are hydroxides, carbonates, bicarbonates and phosphates of an alkali metal or earth alkali metal.

Examples of compounds for controlling the molecular mass are monovalent phenols such as phenol, p-alkylphenols and para-bromophenol and secondary amines.

Such polycarbonates, their preparation and properties are described in detail in for example Encycl. Polym. Sci. Eng., 11, p. 648-718 (Wiley, New York, 1988) and in Kunststoff Handbuch, 3/1, p. 117-297 (Hanser Verlag, Muenchen, 1992).

The composition according to the invention preferably contains a polycarbonate derived from bisphenol A and phosgene and optionally minor amounts of other compounds having one, two or more than two reactive groups as comonomers, for instance for controlling the melt viscosity.

The component b) capable of being activated by radiation is a metal-containing (inorganic or organic) compound which as a consequence of absorption of electromagnetic radiation liberates metal in elemental form, in a chemical reaction. It is also possible that the electromagnetic radiation is not directly absorbed by the metal-containing compound, but is absorbed by other substances which then transfer the absorbed energy to the metal-containing compound and thus bring about the liberation of elemental metal. The electromagnetic radiation may be UV light (wavelength from 100 to 400 nm), visible light (wavelength from 400 to 800 nm), or infrared light (wavelength from 800 to 25 000 nm). Other preferred forms of radiation are X-rays, gamma rays, and particle beams (electron beams, [alpha]-particle beams, and [beta]-particle beams).

The metal compound b) is capable of being activated by electromagnetic radiation and thereby forming elemental metal nuclei within the polycarbonate composition. The component b) capable of being activated by radiation is comprised of electrically non-conductive high-thermal-stability organic or inorganic metal compounds which are preferably insoluble and stable in aqueous acidic or alkaline metalizing baths. Particularly suitable compounds are those which absorb a very large proportion of the light at the wavelength of the incident light. Compounds of this type are described in EP-A-1 274 288. Preference is given here to compounds of metals of the d and f group of the Periodic Table of the Elements with non-metals. The metal-containing compounds are particularly preferably metal oxides, in particular oxides of the d-metals of the Periodic Table of the Elements. Higher metal oxides which contain at least two different kinds of cations and have a spinel structure or spinel-related structure, and which remain unchanged in non-irradiated areas of the moulded part that contains the composition of the present invention are particularly suitable. In one particularly preferred embodiment of the invention, the higher oxides are spinels, in particular copper-containing spinels, such as $CuCr_2O_4$. Suitable copper-containing spinels are commercially available, an example being PK 3095 from Ferro (DE) or 34E23 or 34E30 from Johnson Matthey (DE). Copper oxides of the formula CuO or $Cu_2O$ are also particularly suitable, and use is preferably made here of nanoparticles, such as NANOARC® Copper Oxide from Nanophase Technologies Corporation, Illinois, USA. In another particularly preferred embodiment of the invention, the higher spinel oxide is a manganese-containing spinel. As will be understood by a man skilled in the art also a mixture of metal compounds having a spinel structure can be used.

Preferably, the metal compound is represented by the chemical formula $AB_2O_4$ or $B(AB)O_4$. The A component of the formulas is a metal cation having a valence of 2 and is selected from the group consisting of cadmium, zinc, copper, cobalt, magnesium, tin, titanium, iron, aluminum, nickel, manganese, chromium, and combinations of two or more of these. The B component of the formulas is a metal cation having a valence of 3 and is selected from the group consisting of cadmium, manganese, nickel, zinc, copper, cobalt, magnesium, tin, titanium, iron, aluminum, chromium, and combinations of two or more of these.

The polymer compositions of the invention have dispersed therein metal compound(s), where the metal compound preferably comprises two or more metal oxide cluster configurations within a definable crystal formation. The overall crystal formation, when in an ideal (i.e., non-contaminated, non-derivative) state, has the following general formula:

$AB_2O_4$, where i. A is selected from the group consisting of cadmium, zinc, copper, cobalt, magnesium, tin, titanium, iron, aluminum, nickel, manganese, chromium, and combinations thereof, which provides the primary cation component of a first metal oxide cluster ("metal oxide cluster 1") typically a tetrahedral structure, ii. B is selected f from the group consisting of cadmium, manganese, nickel, zinc, copper, cobalt, magnesium, tin, titanium, iron, aluminum, chromium, and combinations thereof and which provides the primary cation component of a second metal oxide cluster ("metal oxide cluster 2") typically an octahedral structure, iii. where within the above groups A or B, any metal cation having a possible valence of 2 can be used as an "A", and any metal cation having a possible valence of 3 can be used as a "B", iv. where the geometric configuration of "metal oxide cluster 1" (typically a tetrahedral structure) is different from the geometric configuration of "metal oxide cluster 2" (typically an octahedral structure), v. where a metal cation from A and B can be used as the metal cation of "metal oxide cluster 2" (typically the octahedral structure), as in the case of an 'inverse' spinel-type crystal structure, vi. where O is primarily, if not exclusively, oxygen; and vii. where the "metal oxide cluster 1" and "metal oxide cluster 2" together provide a singular identifiable crystal type structure having heightened susceptibility to electromagnetic radiation.

The concentration of these components b) present in the composition of the present invention is from 0.5 up to 20 mass %, preferably from 1 up to 20 mass %, preferably from 3 up to 10 mass %, more preferably from 4 up to 10 mass %, and particularly preferably from 5 up to 10 mass %.

It has surprisingly been found that the presence of a rubber like polymer in an amount of at least 2.5 mass % in aromatic polycarbonate compositions comprising a metal compound capable of being activated by electromagnetic radiation and thereby forming elemental metal nuclei, results in less degradation or even prevents the degradation of the polycarbonate in the composition, as for example manifested in an increase of melt flow stability and/or toughness. Component c) in the composition of the present invention is at least one rubber like polymer. The rubber-like polymer is or contains an elastomeric (i.e. rubbery) polymer having preferably a $T_g$ less than about 10° C., more specifically less than about −10° C., or more specifically about −20° C. to −80° C. Examples of elastomeric polymers include polyisoprene; butadiene based rubbers like polybutadiene, styrene-butadiene random copolymer and block copolymer, hydrogenates of said block copolymers, acrylonitrile-butadiene copolymer and butadiene-isoprene copolymer; acrylate based rubbers like ethylene-methacrylate and ethylene-butylacrylate, acrylate ester-butadiene copolymers, for example acrylic elastomeric polymers such as butylacrylate-butadiene copolymer; siloxane based rubbers like polyorganosiloxanes such as for example polydimethylsiloxane, polymethylphenylsiloxane and dimethyl-diphenylsiloxane copolymer; and other elastomeric polymers like ethylene-propylene random copolymer and block copolymer, copolymers of ethylene and α-olefins, copolymers of ethylene and aliphatic vinyl such as ethylene-vinyl acetate, and ethylene-propylene non-conjugated diene terpolymers such as ethylene-propylene-hexadiene copolymer, butylene-isoprene copolymer, and chlorinated polyethylene, and these substances may be used individually or in combinations of two or more. Preferred elastomeric polymers include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; siloxane rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers. More preferred elastomeric polymers are butadiene based rubbers, acrylate based rubbers and siloxane based rubbers. Particularly preferred elastomeric polymers are siloxane rubbers and butadiene based rubbers, with polybutadiene, styrene-butadiene random copolymer and block copolymer, hydrogenates of said block copolymers being particularly preferred. In one preferred embodiment, the composition according to the invention contains at least a butadiene based rubber as component c). In another preferred embodiment, the composition according to the invention contains at least a siloxane based rubber as component c).

In one embodiment of the present invention, the composition according to the invention contains an elastomeric polymer as at least one of the rubber like polymers. Non-limiting examples of elastomeric polymers and preferred elastomeric polymers are listed above. In a preferred embodiment, the composition contains a butadiene based rubber, an acrylate based rubber or a siloxane based rubber as rubber like polymer. Non-limiting examples of butadiene based rubbers, acrylate based rubbers or siloxane based rubbers are described above. Particularly preferred rubber like polymers are siloxane rubbers and butadiene based rubbers, with polybutadiene, styrene-butadiene random copolymer and block copolymer, hydrogenates of said block copolymers being particularly preferred.

In another and more preferred embodiment of the present invention, the composition according to the invention contains, as at least one of the rubber like polymers, a component containing an elastomeric polymer as described above. The component containing an elastomeric polymer is preferably a graft copolymer containing an elastomeric polymer. More preferably, the component containing an elastomeric polymer is obtained by grafting the elastomeric polymer with a rigid polymeric superstrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core. The rubber like polymer(s) present in the composition of the present invention is thus an optionally grafted elastomeric polymer. In case the elastomeric polymer is grafted, the grafted elastomeric polymer is preferably a graft copolymer obtained by grafting the elastomeric polymer with a rigid polymeric superstrate. The graft copolymer is preferably a graft copolymer prepared by polymerizing 5 to 90 parts by weight, based on the graft copolymer, of one or more monomers in the presence of 95 to 10 parts by weight, based on the graft copolymer, of particles of the elastomeric polymer.

Preferred components c) are graft copolymers prepared by polymerizing 5 to 90 parts by weight, based on c), of one or more monomers in the presence of 95 to 10 parts by weight, based on c), particles of the elastomeric polymer because the use of the monomer(s) results in an increased compatibility between the rubber like polymer and the polycarbonate matrix and hence results in that component c) is more uniformly dispersed in the polycarbonate matrix to further decrease the degradation of the aromatic polycarbonate in an aromatic polycarbonate composition also containing a metal compound b) capable of being activated by electromagnetic radiation and thereby forming elemental nuclei.

In case the elastomeric polymer is a siloxane based rubber, component c) is preferably a polyorganosiloxane containing graft copolymer preferably prepared by polymerizing 5 to 60 parts by weight of a vinyl monomer (c-I) in the presence of 40 to 95 parts by weight of polyorganosiloxanes particles (c-II) (the sum of (c-I) and (c-II) is 100 parts by weight), as for example described in US2005/0143520. Examples of the vinyl monomers (c-I) include, for example, aromatic vinyl monomers such as styrene, alpha-methylstyrene, p-methylstyrene, and p-butylstyrene; vinylcyanide monomers such as acrylonitrile and methacrylonitrile; (meth)acrylic acid ester monomers such as methyl acrylate, ethyl acrylate, propyl acrylate, butyl acrylate, 2-ethylhexyl acrylate, glycidyl acrylate, hydroxyethyl acrylate, hydroxybutyl acrylate, methyl methacrylate, ethyl methacrylate, butyl methacrylate, lauryl methacrylate, glycidyl methacrylate, and hydroxyethyl methacrylate; and carboxyl-group-containing vinyl monomers such as itaconic acid, (meth)acrylic acid, fumaric acid, and maleic acid. The vinyl monomer (c-I) may include a multifunctional monomer having at least two polymerizable unsaturated bonds per molecule, if necessary. Examples of the multifunctional monomers include allyl methacrylate, triallyl cyanurate, triallyl isocyanurate, diallyl phthalate, ethylene glycol di methacrylate, 1,3-butylene glycol dimethacrylate, and divinylbenzene. The vinyl monomer (c-I) may be used alone or in combination. The polyorganosiloxane particles (c-II) are preferably prepared by emulsion polymerization of the constituent components. A normal seeded emulsion polymerization can be applied to the graft copolymerization and can be achieved by radical-polymerizing the vinyl monomer (c-I) in latex of the polyorganosiloxane particles (c-II).

In a preferred embodiment of the invention, component c) is one or more graft copolymer of c.1.) 5 to 90 parts by weight, preferably 20 to 90 parts by weight, based on c), of a mixture of c.1.1) 50 to 95% by weight styrene, α-methyl styrene, nucleus-substituted styrene, methyl methacrylate or mixtures thereof, and c.1.2) 50 to 5% by weight (meth)acrylonitrile, methyl methacrylate, n-butyl acrylate, t-butyl (meth)acrylate or mixtures thereof, on c.2) 95 to 10 parts by weight, preferably 80 to 10 parts by weight, based on c), of an elastomeric polymer selected from a butadiene based rubber, a rubber of ethylene, propylene and an unconjugated diene, and an acrylate based rubber. Preferably c.2) being a butadiene based rubber. Examples of suitable butadiene based rubbers, rubbers of ethylene, propylene and an unconjugated diene and acrylate based rubbers are given above. Useful graft copolymers are for example described in EP-A-1007593 and U.S. Pat. No. 5,061,745. Particularly preferred graft copolymers are ABS resin (acrylonitrile-butadiene-styrene copolymer), AES resin (acrylonitrile-ethylene-propylene-styrene copolymer), AAS resin (acrylonitrile-acrylic elastomer-styrene copolymer), and MBS (methyl methacrylate butadiene styrene copolymer). Particularly preferred graft copolymers are acrylonitrile butadiene styrene rubber (ABS), methylmethacrylate butadiene styrene rubber (MBS) or a mixture of these copolymers, because of the high compatibility between the polycarbonate matrix and such copolymers, thereby enabling that these copolymers can be uniformly dispersed into the polycarbonate matrix to further decrease the degradation of the aromatic polycarbonate in an aromatic polycarbonate composition also containing a metal compound b) capable of being activated by electromagnetic radiation and thereby forming elemental nuclei. From an economic point of view is acrylonitrile butadiene styrene (ABS) even more preferred. Any commercially available ABS may be applied. Particularly preferred acrylonitrile butadiene styrene (ABS) is acrylonitrile butadiene styrene a rubber content of 10 to 50 parts by weight, preferably 10 to 40 parts by weight and even more preferably 10 to 30 parts by weight.

In one preferred embodiment of the invention, the composition comprises an aromatic polycarbonate, a metal compound b), a siloxane based rubber or a siloxane based rubber containing graft copolymer as rubber-like polymer, wherein the siloxane based rubber or the siloxane based rubber containing graft copolymer is added to reduce the degradation of the aromatic polycarbonate in an aromatic polycarbonate composition also containing a metal compound b). In this embodiment the rubber-like polymer is preferably a polyorganosiloxane containing graft copolymer preferably prepared by polymerizing 5 to 60 parts by weight of a vinyl monomer (c-I) in the presence of 40 to 95 parts by weight of polyorganosiloxanes particles (c-II) (the sum of (c-I) and (c-II) is 100 parts by weight), as for example described in US2005/0143520. Examples of the vinyl monomers (c-I) are described above. In another preferred embodiment of the invention, the composition comprises an aromatic polycarbonate, a metal compound b) and ABS, the latter is added to reduce the degradation of the aromatic polycarbonate in an aromatic polycarbonate composition also containing a metal compound b).

The concentration of these components c) present in the composition of the present invention is from 2.5 up to 50 mass %, preferably from 3 up to 50 mass %, more preferably from 3.5 up to 50 mass %, even more preferably from 4 up to 50 mass % and even more preferably from 4.5 up to 50 mass %. A man skilled in the art can easily determine, in dependence of the type of component c), the amount of component c) that should at least be present in the polycarbonate composition containing component b) for decreasing or preventing the degradation of the polycarbonate. The concentration of these components c) present in a polycarbonate composition rendered flame retardant by adding one or more, preferably chlorine and bromine free and phosphate ester based, flame retarding compounds is preferably from 2.5 up to 15 mass %, more preferably from 4.5 to 15 mass %. The concentration of these components c) present in a polycarbonate composition that does not contain flame retarding compounds is preferably from 15 up to 50 mass %, more preferably from 20 up to 50 mass % and even more preferably from 30 up to 50 mass %.

The polycarbonate composition according to the invention may further contain d) from 0 to 25 mass % of one or more other additives, wherein the sum of a) to d) is 100%. These include the customary additives such as stabilizers against thermal or thermo-oxidative degradation, stabilizers against hydrolytic degradation, stabilizers against degradation from light, in particular UV light, and/or photo-oxidative degradation, impact modifiers, processing aids such as release agents and lubricants, colorants such as pigments and dyes, fillers including minerals such as wollastonite or aluminium silicates, or flame retardants. Suitable examples of such additives and their customary amounts are stated in the aforementioned Kunststoff Handbuch, 3/1.

The polycarbonate composition according to the invention may further contain an acid or an acid salt as additive d). In one embodiment, the acid or acid salt is an inorganic acid or inorganic acid salt. In one embodiment, the acid is an acid comprising a phosphorous containing oxy-acid. In one embodiment, the phosphorous containing oxy-acid is a multiprotic phosphorus containing oxy-acid having the general formula $H_mP_tO_4$, where m and n are each 2 or greater and t is 1 or greater. Examples of such acids include, but are not limited to, acids represented by the following formulas: $H_3PO_4$, $H_3PO_3$, and $H_3PO_2$. In some embodiments, the acid will include one of the following: phosphoric acid, phosphorous acid, hypophosphorous acid, hypophosphoric acid, phosphinic acid, phosphonic acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid, or fluorohypophosphoric acid. Alternatively, acids and acid salts, such as, for example, sulphuric acid, sulphites, mono zinc phosphate, mono calcium phosphate, mono natrium phosphate, and the like, may be used. It has been found that the presence of acid or acid salt may result in a further decrease of the degradation of the aromatic polycarbonate in an aromatic polycarbonate composition also containing a metal compound b). It has been found that the presence of acid or acid salt is in particular advantageous in case there is, despite the presence of component c) in the polycarbonate composition, still substantial, although reduced, degradation of the polycarbonate. In case the acid or acid salt is present in the composition of the invention, the acid or acid salt is preferably present in the composition in an amount of 0.01-1 mass %. A man skilled in the art will be able to find, in dependence of the amounts and types of component c), the optimum amount of acid or acid salt as is to be used for further reducing the degradation of the polycarbonate. In one embodiment of the invention, the composition comprises an aromatic polycarbonate, a metal compound b), MBS as rubber-like polymer c) and an acid or acid salt, wherein MBS and the acid or acid salt are added to reduce the degradation of the aromatic polycarbonate in an aromatic polycarbonate composition also containing a metal compound b).

Although a polycarbonate such as bisphenol-A polycarbonate in itself has a fairly good flame retarding behaviour, a polycarbonate composition is preferably rendered flame retardant by adding one or more flame retarding compounds. Suitable examples of flame retarding compounds are certain alkali or earth alkali sulphonates, sulphonamide salts, perfluoroborates, halogenated compounds, especially bromated aromatic compounds, and phosphorus-bearing organic compounds, especially phosphate esters such as triphenyl phosphate. Suitable phosphorus-bearing compounds are described in for example DE 19828535 A1 (Komponente E), in EP 0640655 A2 (Komponente D) and in EP 0363608 A1 (component C). As flame retarding compound use is preferably made of at least an oligomer phosphate ester, such as resorcinol diphenylphosphate (RDP), bisphenol-A diphenylphosphate (BDP) or mixtures thereof. Such compositions exhibit an excellent combination of mechanical, flame retarding and processing properties. Additionally the composition often contains a fluoropolymer such as polytetrafluoroethylene to enhance its dripping properties in a fire test.

In a preferred embodiment, the composition of the present invention further comprises a particulate additive, such as fillers. Typical fillers are inorganic and/or organic particles, such as silicon dioxide (natural, precipitated, or fumed), calcium carbonate, magnesium carbonate, barium carbonate, calcium sulfate, barium sulfate, lithium phosphate, calcium phosphate, magnesium phosphate, titanium dioxide (rutile or anatase), kaolin (hydrated or calcined), aluminum oxide, aluminum silicates, lithium fluoride, the calcium, barium, zinc, or manganese salts of the dicarboxylic acids used, or crosslinked polymer particles, e.g. polystyrene or polymethyl methacrylate particles. In a more preferred embodiment of the present invention, the particulate additive is titanium dioxide suited for the use in aromatic polycarbonate. It has been found that the presence of such laser absorbing additives results in that accumulation and/or adhesion of metal, obtained by metallization of the irradiated areas of moulded parts obtained from such a composition, can be increased.

The polymer composition may further comprise reinforcing agents, such as glass fibres.

The components b), c) and optionally other additives as described above, and also any other particulate additives and reinforcing agents may be introduced into the aromatic polycarbonate by means of suitable mixing devices such as single-screw or twin-screw extruders, preferably a twin-screw extruder is used. Preferably, aromatic polycarbonate pellets are introduced into the extruder together with at least components b) and c) and extruded, then quenched in a water bath and then pelletized. The invention therefore further relates to a process for producing an aromatic polycarbonate composition according to the present invention by melt mixing components a), b), c) and optionally other (particulate) additives also any other particulate additives and reinforcing agents.

The invention further relates to moulded parts that contains the polycarbonate composition according to the present invention. The invention relates in particular to a moulded part produced by injection moulding of the composition according to the invention. It has surprisingly been found that moulded parts containing the polycarbonate composition according to the present invention possess mechanical properties that are on the same or almost on the same level as that of a similar composition not containing component b); in particular strength and rigidity, and toughness, in particular elongation at break, resistance to crack formation following drop test and resistance to crack formation as initiated by certain chemicals such as organic solvents (i.e. environmental stress cracking resistance or ESCR). This is especially advantageous for moulded parts that are a structural element of a small but complex appliance such as a mobile telephone (GSM), a personal digital assistant (PDA), and the like. The high toughness allows high loading of screwed joints or 'snap fit' joints between moulded parts.

The invention accordingly also relates to an article, in particular a circuit carrier, that contains a moulded part produced from the composition according to the invention. In one embodiment, such a circuit carrier is used for producing an antenna.

The invention further relates to a process for producing such a circuit carrier which process comprises the steps of providing a moulded part that contains the polycarbonate composition according to the present invention, irradiating areas of said part on which conductive tracks are to be formed with electromagnetic radiation to break down the metal compound b) and releasing metal nuclei, and subsequently metallizing the irradiated areas (by chemical reduction). In a preferred embodiment, electromagnetic radiation is used to simultaneously release metal nuclei and effect ablation of the part while forming an adhesion-promoting surface. This provides a simple means to achieve excellent adhesive strength of the deposited metallic conductor tracks. Advantageously, a laser is used to produce the electromagnetic radiation to release the metal nuclei. Thus, the electromagnetic radiation is preferably laser radiation. The wavelength of the laser is advantageously 248 nm, 308 nm, 355 nm, 532 nm, 1064 nm or of even 10600 nm. The deposition of further metal onto the metal nuclei generated by electromagnetic radiation preferably takes place via electroplating (solution-chemistry) processes. Said metallizing is preferably performed by immersing the moulded part in at least one electroless plating bath to form electrically conductive pathways on the irradiated areas of the moulded part.

The invention will now be elucidated with reference to the following examples and comparative experiments.

COMPARATIVE EXPERIMENTS A-H AND EXAMPLES 1-8

The compositions of Comparative Experiments (CEx) A-H and of Examples (Ex) 1-8 were prepared from the components as given in Table 1.

All samples were extruded on a co-rotating twin screw extruder at a temperature of 280° C. according the compositions as given in Table 2 to 5. The extrudate was granulated. Using the collected granulate, MFI and MV (melt viscosity) was measured at 260° C./5 kg load (IS01133) and 260° C./1500 $s^{-1}$ (determined in a capillary rheograph using a capillary with a L/D ratio of 30 according to ISO 11443), respectively for the PC-ABS compositions (Table 3) and at 300° C./1.2 kg load and 300° C./1500 $s^{-1}$ for the other compositions (Table 4 and 5). To illustrate any side effect of the difference in temperature of the MFI and MV measurement, the PC-ABS compositions using ABS 1 (CEx C and Ex 1) were also measured at both temperature settings (260° C. and 300° C.). Subsequently, the granulate was injection moulded into Izod bars and plaques (70*50*2 mm) using a melt temperature of 260° C. for PC-ABS compositions (Table 3) and using a melt temperature of 290° C. for the other compositions (Table 5 and 5). Izod Notched impact strength was measured according to ISO180/4A.

Plating performance was judged after laser activation on the injection molded plaques and a subsequent plating procedure in an electroless galvanic plating bath. Plating performance was judged according to the thickness of the copper layer and the adhesion strength of the metal layer onto the polymer substrate.

The level of degradation of polycarbonate was judged by comparison of the flow (MFI and MV) and toughness properties (Izod Notched Impact) of the samples with and without the copper chromite spinel. To illustrate that this is in accordance with the molecular weight degradation, the molecular weight of samples CEx A, CEx B and Ex 1 was also measured by Gel Permeation Chromatography (GPC) in dichloromethane solvent. Linear Polystyrene was used for calibration, so values reported are Polycarbonate weight averaged molecular weight (Mw) relative to Polystyrene.

Table 2 shows the compositions and results of Comparative Experiment A and B. Comparing CEx A and CEx B shows that addition of the copper chromite spinel to a polycarbonate composition results in a very high increase of MFI and very high decrease of MV, indicating that polycarbonate is degraded to a high extent, as is confirmed by the weight average molecular weight (Mw) measured by GPC. This reduction of molecular weight also results in a high decrease of the toughness (Izod Notched Impact).

Table 3 and 4 show the compositions and results of Comparative Experiment C to H and Example 1 to 6 of respectively the PC-ABS blends and the other PC-rubber blends. Comparing the results of the Examples with copper chromite spinel with the Comparative Experiments without the copper chromite spinel shows that the presence of the copper chromite spinel ($CuCr_2O_4$ powder) in a blend of polycarbonate with a rubber-like polymer surprisingly results in that the MFI does not increase at all or to a much lesser extent, the MV does not decrease at all or to a much lesser extent and the toughness remains on the same level or decreases to a much lesser extent as for Comparative Experiment B (compared to CEx A). This indicates that the polycarbonate is degraded to a much lesser extent when the copper chromite spinel is added to the blends of Polycarbonate with a rubber-like polymer than when added to polycarbonate alone (like in CEx B). This reduction in degradation is also confirmed by the weight average molecular weight (Mw) result as measured by GPC on Ex 1, which shows an almost similar value as the reference CEx A.

Table 5 shows the compositions and results of Example 7 and 8, which are blends similar to Example 4 and 6, but with the addition of 0.1% Mono Zinc Phosphate (MZP). It is shown that addition of an acid salt like MZP can lead to a further stabilization (decrease in MFI and increase in MV and toughness) for the blends that showed the largest difference between the Comparative Experiments (CEx F and CEx H) and their Examples (Ex 4 and Ex 6).

TABLE 1

| Material | Type | Supplier |
|---|---|---|
| Polycarbonate (PC) | LVN (ISO 1628/4) = 54.5-59.5 ml/g | DSM |
| ABS 1 | Santac AT-05 | Mitsui Germany |
| ABS 2 | Santac ST-55 | Mitsui Germany |
| ABS 3 | DP-611 | Mitsui Germany |
| MBS | Kane Ace M511 | Kaneka |
| Siloxane rubber | Kane Ace MR-02 | Kaneka |
| All Acrylic rubber | Paraloid XL 3361 | Rohm & Haas |
| Mold release (MRA) | Loxiol P861/3.5 | Cognis |
| Heat stabilizer | Irgafos 168 | Ciba |
| $CuCr_2O_4$ (Copper chromite spinel) | Black 1G | Shepherd Company |
| MZP | Z 21-82 (Mono Zinc Phosphate) | Budenheim |

TABLE 2

| | Units | Sample | |
|---|---|---|---|
| | | CEx A | CEx B |
| Components | | | |
| PC | % | 99.45 | 91.45 |
| $CuCr_2O_4$ | % | — | 8 |
| MRA + Heat Stab | % | 0.55 | 0.55 |
| Properties | | | |
| MFI (300° C./1.2 kg) | g/10 min | 5.5 | 51.1 |
| MV (300° C./1500 $s^{-1}$) | Pa · s | 425 | 101 |
| Izod Notched 4A (23° C.) | kJ/$m^2$ | 86 | 8 |
| Mw of PC | Kg/mol | 32 | 19 |

TABLE 3

| | Units | Sample | | | | | |
|---|---|---|---|---|---|---|---|
| | | CEx C | Ex 1 | CEx D | Ex 2 | CEx E | Ex 3 |
| Components | | | | | | | |
| PC | % | 60.75 | 56.0 | 60.75 | 56.0 | 60.75 | 56.0 |
| ABS 1 | % | 38.7 | 35.45 | | | | |
| ABS 2 | % | | | 38.7 | 35.45 | | |
| ABS 3 | % | | | | | 38.7 | 35.45 |
| $CuCr_2O_4$ | % | — | 8 | — | 8 | — | 8 |
| MRA + Heat Stab | % | 0.55 | 0.55 | 0.55 | 0.55 | 0.55 | 0.55 |
| Properties | | | | | | | |
| MFI (260° C./1.2 kg) | g/10 min | 23.0 | 26.0 | 15.1 | 17.8 | 4.8 | 3.3 |
| MFI (300° C./1.2 kg) | g/10 min | 16.5 | 17.6 | | | | |
| MV (260° C./1500 $s^{-1}$) | Pa · s | 154 | 157 | 197 | 197 | 365 | 350 |
| MV (300° C./1500 $s^{-1}$) | Pa · s | 88 | 86 | | | | |
| Izod Notched 4A (23° C.) | kJ/$m^2$ | 65 | 55 | 78 | 58 | 61 | 59 |
| Mw of PC | Kg/mol | | 31 | | | | |
| Plating Performance* | | — | good | — | good | — | good |

*after laser activation; only measured for Examples with Copper Chromite spinell

TABLE 4

| | Units | Sample | | | | | |
|---|---|---|---|---|---|---|---|
| | | CEx F | Ex 4 | CEx G | Ex 5 | CEx H | Ex 6 |
| Components | | | | | | | |
| PC | % | 81.45 | 81.45 | 81.45 | 81.45 | 81.45 | 81.45 |
| MBS | % | 10 | 10 | | | | |
| Siloxane rubber | % | | | 10 | 10 | | |
| All Acrylic rubber | % | | | | | 10 | 10 |
| $CuCr_2O_4$ | % | — | 8 | — | 8 | — | 8 |
| MRA + Heat Stab | % | 0.55 | 0.55 | 0.55 | 0.55 | 0.55 | 0.55 |
| Properties | | | | | | | |
| MFI (300° C./1.2 kg) | g/10 min | 3.4 | 6.7 | 2 | 2.1 | 7 | 7.6 |
| MV (300° C./1500 $s^{-1}$) | Pa · s | 367 | 190 | 318 | 302 | 281 | 193 |

TABLE 4-continued

| | Units | Sample | | | | | |
|---|---|---|---|---|---|---|---|
| | | CEx F | Ex 4 | CEx G | Ex 5 | CEx H | Ex 6 |
| Izod Notched 4A (23° C.) | $kJ/m^2$ | 63 | 50 | 68 | 59 | 68 | 69 |
| Plating Performance* | | — | good | — | good | — | good |

*after laser activation; only measured for Examples with Copper Chromite spinell

TABLE 5

| | Units | Sample | |
|---|---|---|---|
| | | Ex 7 | Ex 8 |
| Components | | | |
| PC | % | 81.35 | 81.35 |
| MBS | % | 10 | |
| All Acrylic rubber | % | | 10 |
| $CuCr_2O_4$ | % | 8 | 8 |
| MRA + Heat Stab | % | 0.55 | 0.55 |
| MZP | % | 0.1 | 0.1 |
| Properties | | | |
| MFI (300° C./1.2 kg) | g/10 min | 3.4 | 6.7 |
| MV (300° C./1500 $s^{-1}$) | Pa · s | 310 | 209 |
| Izod Notched 4A (23° C.) | $kJ/m^2$ | 58 | 66 |
| Plating performance* | | good | good |

*after laser activation

The invention claimed is:

1. A process for producing a circuit carrier comprising at least a moulded part and a circuit carried by the moulded part, wherein the moulded part includes a polycarbonate composition comprising the following components:

a) 30-97 mass % of aromatic polycarbonate, b) 0.5-20 mass % of a metal compound capable of being activated by electromagnetic radiation and thereby forming elemental metal nuclei, and c) 2.5-50 mass % of at least one rubber-like polymer, wherein the sum of a)-c) is 100%, wherein the process comprises the steps of providing the moulded part, irradiating areas of said part on which conductive tracks are to be formed with electromagnetic radiation to break down the metal compound b) and releasing metal nuclei, and subsequently metallizing the irradiated areas.

2. The process according to claim 1, wherein component b) is a metal oxide having a spinel structure.

3. The process according to claim 1, wherein component b) is $CuCr_2O_4$.

4. The process according to claim 1, wherein the composition contains, as the rubber like polymer, an elastomeric polymer.

5. The process according to claim 1, wherein the composition contains, as the rubber like polymer, a graft copolymer containing an elastomeric polymer.

6. The process according to claim 5, wherein the graft copolymer containing an elastomeric polymer is a graft copolymer prepared by polymerizing 5 to 90 parts by weight, based on the graft copolymer, of one or more monomers in the presence of 95 to 10 parts by weight, based on the graft copolymer, of particles of the elastomeric polymer.

7. The process according to claim 1, wherein component c) is a butadiene based rubber, an acrylate based rubber or a siloxane based rubber.

8. The process according to claim 1, wherein component c) is at least one graft copolymer prepared by polymerizing 5 to 90 parts by weight, based on c), of one or more monomers in the presence of 95 to 10 parts by weight, based on c), of particles of an elastomeric polymer.

9. The process composition according to claim 1, wherein the composition contains at least acrylonitrile butadiene styrene (ABS) as component c).

10. The circuit carrier obtained by the process of claim 1.

* * * * *